United States Patent Office 3,542,891
Patented Nov. 24, 1970

3,542,891
PREPARATION OF ALKENIC COMPOUNDS
Louis Schmerling, Riverside, Ill., assignor to Universal Oil Products Company, Des Plaines, Ill., a corporation of Delaware
No Drawing. Filed Nov. 8, 1968, Ser. No. 774,535
Int. Cl. C07c 11/02, 149/00
U.S. Cl. 260—677
14 Claims

ABSTRACT OF THE DISCLOSURE

Alkenic compounds, and particularly alkenic hydrocarbons, are prepared by treating an alkyl sulfide with a lower molecular weight olefinic hydrocarbon at an elevated temperature to form primary alkenic compounds.

This invention relates to a process for the formation of alkenic compounds, and particularly to a process for the preparation of alkenic hydrocarbons.

Alkenic compounds, and particularly alkenic hydrocarbons, will find a wide variety of use in the chemical field. For example, the butenes, and particularly 1-butene, may be utilized as an intermediate in the preparation of polymer and alkylate gasoline, for preparing polybutene, butadiene, aldehydes, and alcohols; 2-butene may be used as an alkylating agent, as a cross-linking agent for polymer gasoline, etc. Other alkenes such as 1-hexene may be used in the synthesis of flavors, perfumes, medicines, dyes, etc., while 1-octene may be used as an intermediate in organic synthesis. Other alkenes containing an internal olefinic linkage will also find varied uses in the chemical field.

As hereinafter shown in greater detail, the process of the present invention may be utilized as a part of a continuous process for preparing alkenes in which the olefinic linkage is on an external carbon atom. Furthermore, by utilizing the process of the present invention, olefinic hydrocarbons may be obtained in pure form due to a lesser degree of isomerization of the olefinic product which is formed during the reaction.

It is therefore an object of this invention to provide a process for the preparation of alkenic compounds.

A further object of this invention is to provide a process for preparing alkenic compounds, and particularly 1-alkenes, using an alkyl sulfide as the starting material.

One aspect of this invention will be found in a process for the preparation of an alkene which comprises treating an alkyl sulfide with a lower molecular weight olefin at an elevated temperature, and recovering the resultant alkene.

Another aspect of this invention is to be found in a process for preparing an alkene which comprises treating phenyl n-octyl sulfide at a temperature in a range of from about 200° to about 400° C. with ethylene, and recovering the resultant 1-octene.

Other objects and embodiments will be found in the following further detailed description of the present invention.

As hereinbefore set forth, the present invention is concerned with a process for preparing alkenic compounds, and particularly alkenic hydrocarbons from alkyl sulfides, said process consisting of the treatment of an alkyl sulfide with a lower molecular weight olefin. For purposes of this invention, the term "alkyl sulfides" as used in the present specification and appended claims will include dialkyl sulfides, aryl alkyl sulfides, cycloalkyl alkyl sulfides, aralkyl alkyl sulfides, alkaryl alkyl sulfides, etc., the aryl alkyl sulfides being the preferred starting material due to the fact that a pure olefinic compound may be more readily obtained.

In the preferred embodiment of this invention, the reaction is carried out under thermal conditions, the reaction being effected at a temperature in the range of from about 200° to about 400° C. and preferably at a temperature in the range of from about 250° to about 300° C. In addition, the reaction is effected at superatmospheric pressures ranging from 2 up to about 100 atmospheres. The pressure is usually provided for by the introduction of a lower molecular weight olefin such as ethylene or propylene which is present in gaseous form. The amount of pressure which is used is that which is sufficient to maintain a major portion of the sulfide in the liquid phase. While it is contemplated within the scope of this invention that the entire pressure is provided for by the gaseous olefin, it is also possible that said gaseous olefin will provide only a partial pressure and that the remainder of the pressure be provided for by the introduction of an inert gas such as nitrogen along with the gaseous olefin in the reaction zone.

It is also contemplated within the scope of this invention that the formation of the alkenic compound from an alkyl sulfide of the type hereinafter set forth in greater detail may be effected under catalytic conditions. The catalysts which will be utilized will include solid metal oxide catalysts such as alumina, silica, silica-alumina, silica-zirconium-alumina, or a metal composited on a solid support such as nickel composited on a solid support such as nickel composited on kieselguhr, etc. may be used. The non-acidic catalysts will usually be preferred inasmuch as catalysts which are acidic in nature tend to induce isomerization of the olefinic compound which is produced during the reaction.

Examples of alkyl sulfides which may be utilized as starting materials in the process of this invention will include dialkyl sulfides in which the alkyl portion of the molecule will contain from 4 up to about 20 carbon atoms or more, specific examples of these compounds including di-n-butyl sulfide, di-n-pentyl sulfide, di-n-hexyl sulfide, di-n-heptyl sulfide, di-n-octyl sulfide, di-n-nonyl sulde, di-n-decyl sulfide, di-n-undecyl sulfide, di-n-dodecyl sulde, di-n-tridecyl sulfide, di-n-tetradecyl sulfide, di-n-pentadecyl sulfide, di-n-hexadecyl sulfide, di-n-heptadecyl sulfide, di-n-octadecyl sulfide, di-n-nonadecyl sulfide, di-n-eicosyl sulfide; n-butyl n-pentyl sulfide, n-butyl n-hexyl sulfide, n-butyl n-heptyl sulfide, n-butyl n-octyl sulfide, n-butyl n-nonyl sulfide, n-butyl n-decyl sulfide, n-pentyl n-undecyl sulfide, n-pentyl n-dodecyl sulfide, n-hexyl n-tridecyl sulfide, n-hexyl n-tetradecyl sulfide, n-heptyl n-pentadecyl sulfide, n-heptyl n-hexadecyl sulfide, n-heptyl n-heptadecyl sulfide, n-heptyl n-octadecyl sulfide, n-octyl n-nonadecyl sulfide, n-octyl n-eicosyl sulfide, n-nonyl n-tetradecyl sulfide, n-decyl n-hexadecyl sulfide, etc. In addition, the corresponding isomeric dibutyl, dipentyl, dihexyl, diheptyl, dioctyl, dinonyl, didecyl, and mixed dialkyl sulfides may also be used. Other alkyl sulfides which may be used include the aryl alkyl sulfides such as phenyl n-butyl sulfide, phenyl n-pentyl sulfide, phenyl n-hexyl sulfide, phenyl n-heptyl sulfide, phenyl n-octyl sulfide, phenyl n-nonyl sulfide, phenyl n-decyl sulfide, phenyl n-undecyl sulfide, phenyl n-dodecyl sulfide, phenyl n-tridecyl sulfide, phenyl n-tetradecyl sulfide, phenyl n-pentadecyl sulfide, phenyl n-hexadecyl sulfide, phenyl n-heptadecyl sulfide, phenyl n-octadecyl sulfide, phenyl n-nonadecyl sulfide, phenyl n-eicosyl sulfide, etc.; cycloalkyl alkyl sulfides such as cyclopentyl n-hexyl sulfide, other cyclopentyl alkyl sulfides, cyclohexyl n-butyl sulfide, cyclohexyl n-pentyl sulfide, cyclohexyl n-hexyl sulfide, cyclohexexyl n-heptyl sulfide, cyclohexyl n-octyl sulfide, cyclohexyl n-nonyl sulfide, cyclohexyl n-decyl sulfide, cyclohexyl n-undecyl, cyclohexyl n-dodecyl sulfide, cyclohexyl n-tridecyl sulfide, cyclohexyl n-tetradecyl sulfide, cyclohexyl n-pentadecyl sulfide, cyclohexyl n-hexadecyl sulfide, cyclohexyl n-heptadecyl sulfide, cyclohexyl n-octadecyl sulfide, cyclohexyl n-nonadecyl sulfide, cyclohexyl n-eicosyl sulfide, etc.; alkaryl alkyl sulfides such as o-tolyl n-butyl sulfide, o-tolyl n-pentyl sulfide, o-tolyl n-hexyl sulfide, o-tolyl n-heptyl sulde, o-tolyl n-octyl sulfide, o-tolyl n-nonyl sulfide, o-tolyl n-decyl sulfide; m-tolyl n-butyl sulfide, m-tolyl n-pentyl sulfide, m-tolyl n-hexyl sulfide, m-tolyl n-heptyl sulfide, m-tolyl n-octyl sulfide, m-tolyl n-nonyl sulfide, m-tolyl n-decyl sulfide; p-tolyl n-butyl sulfide, p-tolyl n-pentyl sulfide, p-tolyl n-hexyl sulfide, p-tolyl n-heptyl sulfide, p-tolyl n-octyl sulfide, p-tolyl n-nonyl sulfide, p-tolyl n-decyl sulfide, etc.; aralkyl alkyl sulfides such as benzyl n-butyl sulfide, benzyl n-pentyl sulfide, benzyl n-hexyl sulfide, benzyl n-heptyl sulfide, benzyl n-octyl sulfide, benzyl n-nonyl sulfide, benzyl n-decyl sulfide, phenethyl n-heptyl sulfide, etc. While the above set forth compounds illustrate the n-alkyl series of compounds, it is to be understood that isomers thereof such as sec- and tert-alkyl compounds also fall within the scope of this invention.

The aforementioned alkyl sulfides are converted to olefinic compounds by treatment with a low molecular weight olefin. The preferred low molecular weight olefin comprises ethylene. However, it is possible to utilize propylene and other relatively low molecular weight olefins such as the butylene or pentylenes, the criteria being that the olefinic hydrocarbon which is used to treat the alkyl sulfide contain at least two carbon atoms less than the alkyl portion of the sulfide. These other olefinic hydrocarbons, such as propylene, the butenes, pentenes, etc., are used chiefly with alkyl sulfides in which the alkyl group is secondary or tertiary. They will not necessarily result in the obtention of equivalent results.

The process of this invention may be effected in any suitable manner and may comprise either a batch or continuous type operation. For example, when a batch type operation is used a quantity of the alkyl sulfide which is to be treated is placed in an appropriate apparatus. Inasmuch as the reaction is effected at superatmospheric pressures, an autoclave of either the rotating or mixing type will constitute a preferred type of apparatus. The autoclave is then sealed and pressured with the lower molecular weight olefin such as ethylene or propylene until the desired operating pressure is reached. Following this, the vessel and contents thereof are heated to the desired operating temperature and maintained thereat for a predetermined residence time which may range from about 0.5 up to about 10 hours or more in duration. At the end of this time, the autoclave and contents thereof are allowed to return to room temperature, the excess pressure is discharged and the reaction mixture is recovered. The mixture is then subjected to conventional means of separation such as fractional distillation, crystallization, etc. whereby the desired olefinic compound is separated from any unreacted sulfide. As hereinbefore set forth, it is also contemplated within the scope of this invention that the reaction may be effected under catalytic conditions. When such a process is used, the reaction vessel will be provided with the catalytic substance which must then be separated from the reaction mixture, usually by filtration inasmuch as the catalyst will be in a solid state.

It is also contemplated within the scope of this invention that the reaction may be effected in a continuous manner of operation. When such a mode of operation is used, a quantity of the alkyl sulfide which is to undergo treatment is continuously charged to a reaction vessel which is maintained at the proper operation conditions of temperature and pressure. In addition, the lower molecular weight olefinic hydrocarbon is also charged thereto through a separate stream, or, if so desired, the reactants may be admixed prior to entry and the resulting mixture charged thereto in a single stream. Upon completion of the desired residence time, the reactor effluent is continuously withdrawn and subjected to conventional means of separation whereby the desired olefinic hydrocarbon is separated from the unreacted charge stock and recovered, said unreacted charge stock then being recycled to form a portion of the feed stock. When effecting the reaction in a catalytic manner rather than a thermal manner, the reactor will contain the desired catalyst. Inasmuch as the catalyst is in a solid state, a particularly effective method of operation of the present process will comprise a fixed bed type of operation in which the catalyst is disposed as a fixed bed in the reaction zone while the charge stock and lower molecular weight olefin are passed through said bed in either an upward or downward flow. Other methods of catalytic operations will include the moving bed type of operation in which the catalyst bed and the reactants are passed either concurrently or countercurrently through the reaction zone and the slurry type of reaction in which the catalyst is charged to the reactor as a slurry in the alkyl sulfide.

While the aforementioned discussion has taught the reaction of alkyl sulfide with a lower molecular weight olefin to form a higher molecular weight olefin, it is also contemplated within the scope of this invention that the process may be used as part of a continuous or cyclic process for preparing 1-alkenes from a mixture of 1-alkenes and other olefins which contain internal olefinic linkages rather than terminal olefinic linkages. For example it is considered possible to react thiophenol with a mixture of 1-alkenes, 2-alkenes, 3-alkenes, etc. in a free radical induced addition to yield a phenyl n-alkyl sulfide. The reaction conditions under which this operation is effected are well known in the art. For example, the free radical induced addition may be effected in the presence of a free radical generator including peroxide compounds such as di-t-butyl peroxide, etc., at a temperature at least as high as the decomposition temperature of the free radical generator. Following formation of the phenyl n-alkyl sulfide, the sulfide is separated from the internal olefins and then treated with a low molecular weight olefin such as ethylene, according to the process hereinbefore set forth, to yield the 1-alkene and phenyl ethyl sulfide. Following this, the phenyl ethyl sulfide is then converted to thiophenol and ethylene by any process well known in the art such as, for example, heating at an elevated temperature in the presence of a catalytic composition of matter which may include those similar to those hereinbefore set forth, that is, metal oxides such as alumina, silica, or mixtures thereof such as silica-alumina, silica-zirconium-alumina, etc., nickel composited on kieselguhr, etc. The thiophenol and ethylene are also then separated by conventional means and the thiophenol is recycled to react with the mixture of olefins in the first step of the process. In addition, the ethylene which has been separated may then also be utilized as a portion of the feed stock in treating the phenyl n-alkyl sulfide to form the desired olefinic hydrocarbon containing a terminal ethylenic linkage.

The following examples are given to illustrate the process of the present invention which, however, are not intended to limit the generally broad scope of the present invention in strict accordance therewith.

EXAMPLE I

In this example 0.1 mole of phenyl n-octyl sulfide was placed in the glass liner of a rotating autoclave. The liner was sealed into the autoclave and 40 atmospheres of ethylene (equal to about 1.5 moles) was charged thereto. The autoclave was then heated to a temperature of 300° C. and maintained thereat for a period of five hours. During the heating, the pressure rose to a maximum of 88 atmospheres. At the end of the above five-hour period, the autoclave and contents thereof were allowed to return to room temperature, the final pressure at room temperature being 39 atmospheres. The excess pressure was discharged and the reaction product comprising 23.4 grams of liquid product was recovered. The product was subjected to analysis and it was found that there was a 66% conversion of phenyl n-octyl sulfide to phenyl ethyl sulfide and octene with a 95% yield of 1-octene.

EXAMPLE II

In this example, 0.1 mole of phenyl n-hexyl sulfide is placed in a glass liner of a rotating autoclave. Thereafter the liner is sealed into the autoclave and 40 atmospheres of ethylene, which is equivalent to about 1.5 moles, is charged thereto. The autoclave is heated to a temperature of 300° C. and maintained thereat for a residence time which is five hours in duration. At the end of the aforementioned residence time, the autoclave and contents thereof are allowed to cool to room temperature, the excess pressure is discharged and the reaction mixture is recovered. The reaction mixture is then subjected to conventional separation means whereby the desired product comprising 1-hexene is separated from unreacted phenyl n-hexyl sulfide and recovered.

EXAMPLE III

A charge stock consisting of 0.1 moles of cyclohexyl n-decyl sulfide is placed in the glass liner of a rotating autoclave and treated in a manner as hereinbefore set forth in Examples I and II, that is, by charging ethylene to the sealed autoclave and heating said autoclave to a temperature of about 300° C. for a residence time of five hours. At the end of this time, the autoclave and contents thereof are allowed to return to room temperature, the excess pressure is vented and the reaction mixture is recovered. After separation by conventional means, such as fractional distillation, the desired product comprising a mixture of cyclohexene and 1-decene is recovered.

EXAMPLE IV

In this example, a charge stock comprising 0.1 mole of di-n-octyl sulfide was placed in the glass liner of a rotating autoclave and sealed into said autoclave. Following this, 40 atmospheres of ethylene, which equaled about 1.5 moles, was charged thereto and the autoclave was heated to a temperature of 300° C. The autoclave was maintained at this temperature for a period of five hours, during which time the pressure rose to 78 atmospheres. At the end of the five-hour period, the autoclave was allowed to cool to room temperature, the final pressure at room temperature being 40 atmospheres. This pressure was discharged and the reaction product comprising 25.9 grams of a liquid product was recovered. Analysis of the product by means of a gas-liquid chromatograph disclosed the presence of 1-octene.

EXAMPLE V

In this example, 0.1 mole of phenyl n-pentyl sulfide is placed in the glass liner of a rotating autoclave which contains 5 grams of a catalyst comprising nickel composited on kieselguhr. The liner is sealed into the autoclave and 40 atmospheres of ethylene is charged thereto. Following this, the autoclave is heated to a temperature of 300° C. and maintained thereat for a period of five hours. Upon completion of the desired residence time, the autoclave and contents thereof are allowed to return to room temperature, the excess pressure is vented and the reaction mixture is recovered. The mixture is separated from the catalyst by means of filtration and subjected to a gas-liquid chromatographic analysis, said analysis disclosing the presence of 1-pentene.

I claim as my invention:

1. A process for the preparation of an alkene which comprises treating an alkyl sulfide with an olefin of lower molecular weight than said alkyl sulfide at an elevated temperature, and recovering the resultant alkene.

2. The process as set forth in claim 1, further characterized in that said process is effected at a temperature in the range of from about 200° to about 400° C.

3. The process as set forth in claim 1 in which said alkyl sulfide is a dialkyl sulfide.

4. The process as set forth in claim 1 in which said alkyl sulfide is an aryl alkyl sulfide.

5. The process as set forth in claim 1 in which said alkyl sulfide is a cycloalkyl alkyl sulfide.

6. The process as set forth in claim 1 in which said lower molecular weight olefin is ethylene.

7. The process as set forth in claim 1, further characterized in that said process is effected in the presence of a non-acidic catalyst.

8. The process as set forth in claim 7 in which said catalyst is alumina.

9. The process as set forth in claim 7 in which said catalyst is nickel composited on kieselguhr.

10. The process as set forth in claim 1 in which said alkyl sulfide is phenyl n-octyl sulfide and said alkene is 1-octene.

11. The process as set forth in claim 1 in which said alkyl sulfide is phenyl n-hexyl sulfide and said alkene is 1-hexene.

12. The process as set forth in claim 1 in which said alkyl sulfide is cyclohexyl n-decyl sulfide and said alkene is a mixture of cyclohexene and 1-decene.

13. The process as set forth in claim 1 in which said alkyl sulfide is di-n-octyl sulfide and said alkene is 1-octene.

14. The process as set forth in claim 1 in which said alkyl sulfide is phenyl n-pentyl sulfide and said alkene is 1-pentene.

References Cited

UNITED STATES PATENTS 3,312,751   4/1967   Kerr et al. _____ 260—677
3,071,625   1/1963   Kulik et al. _____ 260—609

DELBERT E. GANTZ, Primary Examiner

J. M. NELSON, Assistant Examiner

U.S. Cl. X.R.

260—609